Figure 2:
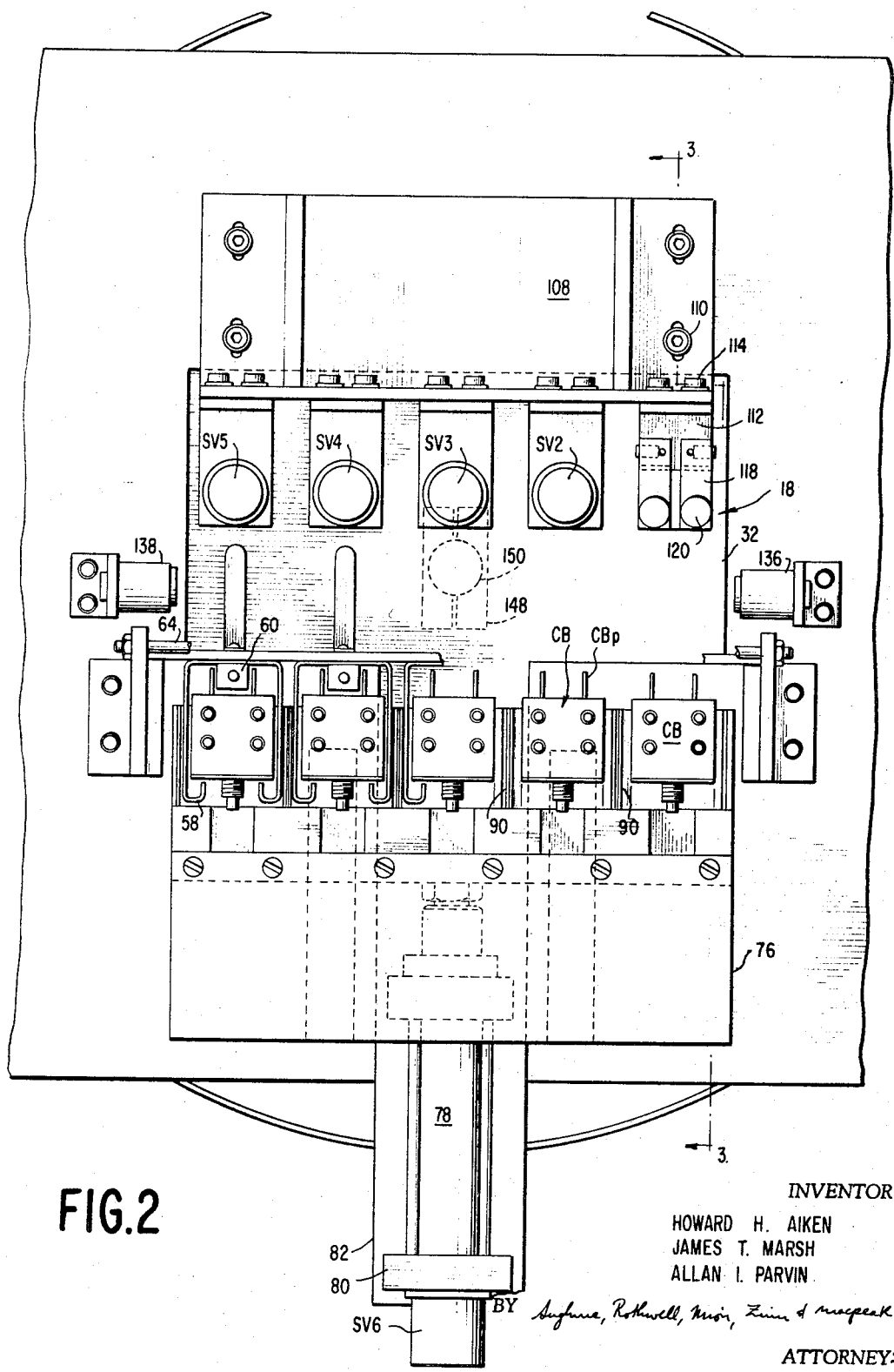

Nov. 5, 1968  H. H. AIKEN ET AL  3,409,127
METHOD AND APPARATUS FOR TESTING ELECTRICAL CIRCUIT BREAKERS
Filed Dec. 20, 1966  5 Sheets-Sheet 1
FIG.1
FIG.10
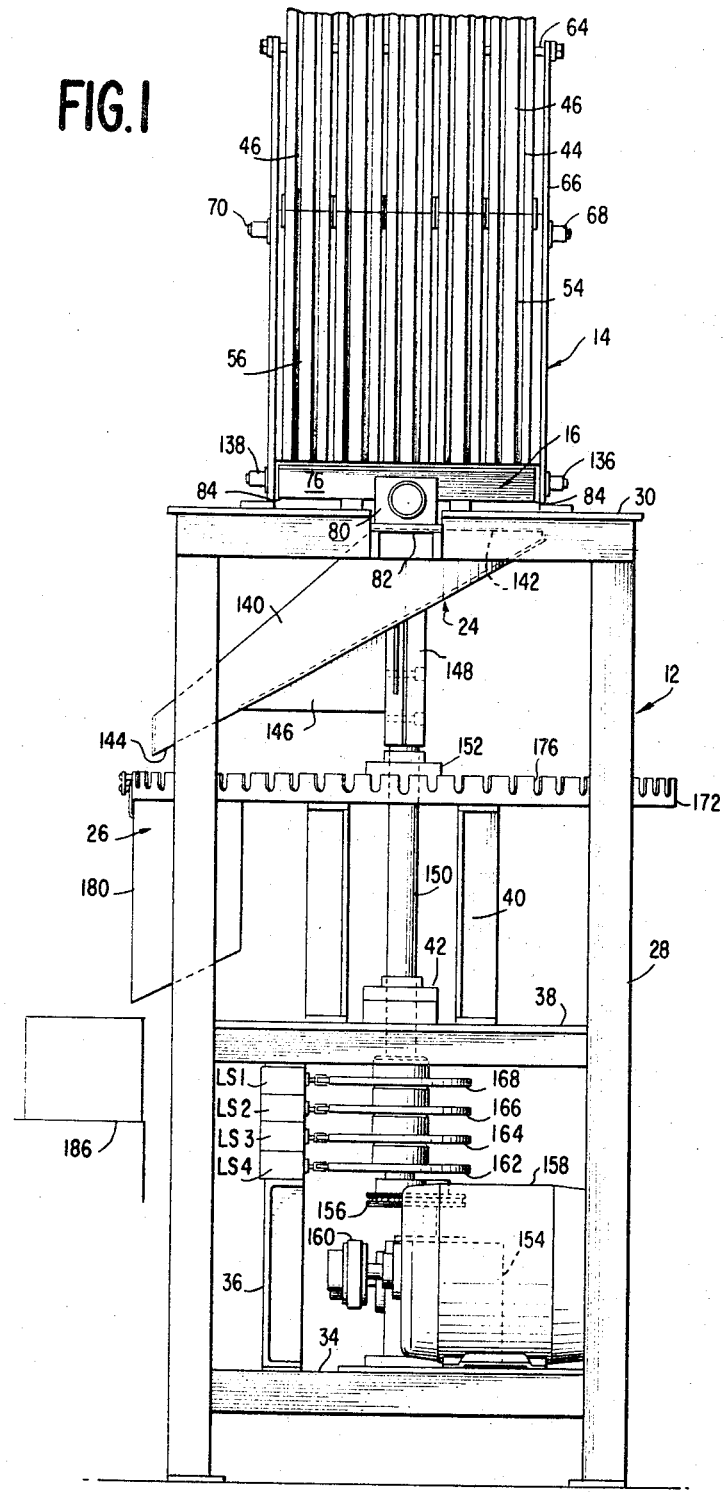
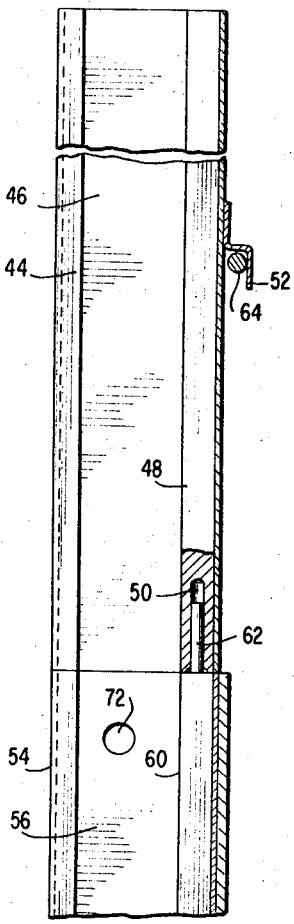
INVENTORS
HOWARD H. AIKEN
JAMES T. MARSH
ALLAN I. PARVIN
BY *Sughrue, Rothwell, Mion, Zinn & Macpeak*
ATTORNEYS Nov. 5, 1968
H. H. AIKEN ET AL
3,409,127
METHOD AND APPARATUS FOR TESTING ELECTRICAL CIRCUIT BREAKERS
Filed Dec. 20, 1966
FIG. 3
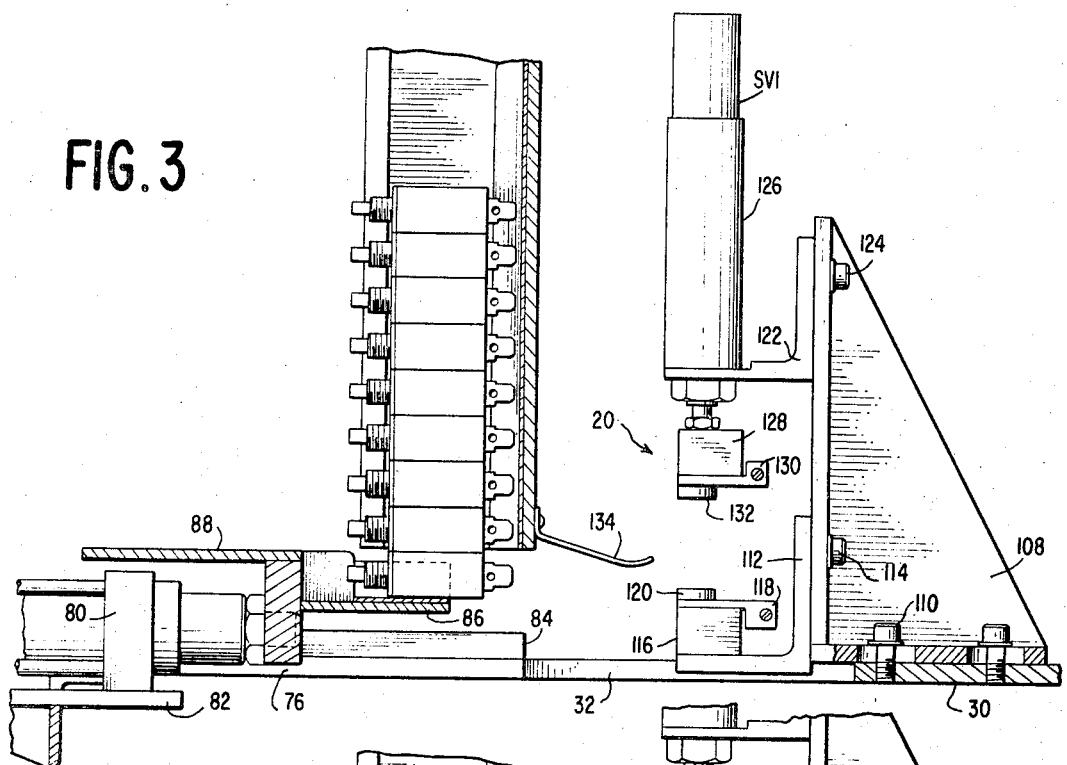
FIG. 4
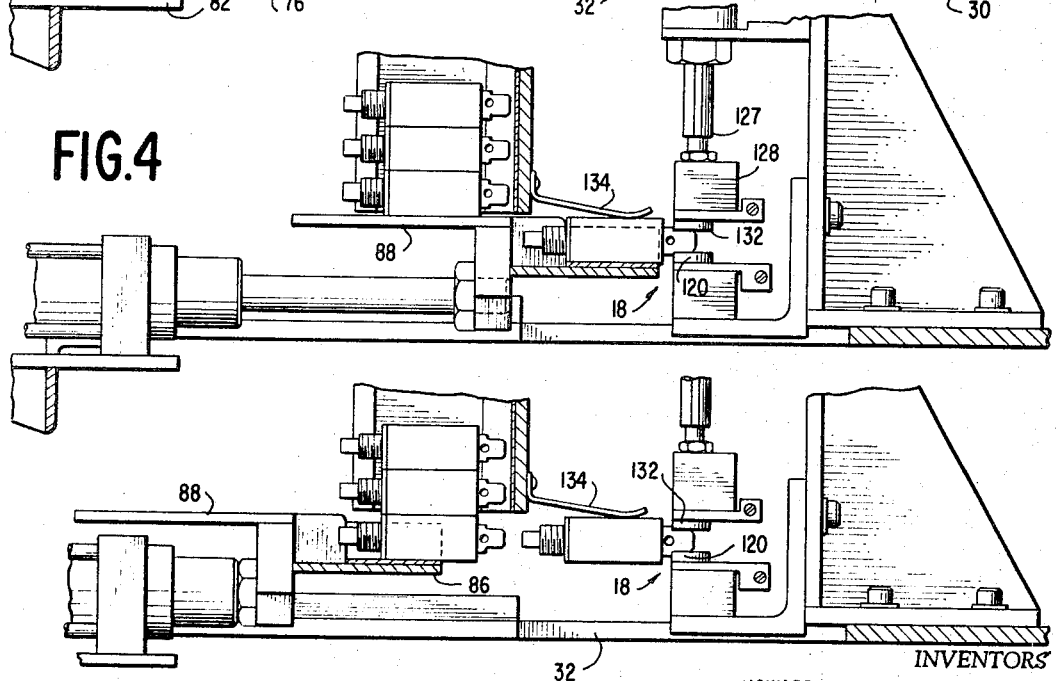
FIG. 5
INVENTORS
HOWARD H. AIKEN
JAMES T. MARSH
ALLAN I. PARVIN
BY *Sughrue, Rothwell, Mion, Zinn & Macpeak*
ATTORNEYS

INVENTORS
HOWARD H. AIKEN
JAMES T. MARSH
ALLAN I. PARVIN

BY

ATTORNEYS

Nov. 5, 1968  H. H. AIKEN ET AL  3,409,127
METHOD AND APPARATUS FOR TESTING ELECTRICAL CIRCUIT BREAKERS
Filed Dec. 20, 1966  5 Sheets-Sheet 5

INVENTORS
HOWARD H. AIKEN
JAMES T. MARSH
ALLAN I. PARVIN

ATTORNEYS

United States Patent Office 3,409,127
Patented Nov. 5, 1968

3,409,127
METHOD AND APPARATUS FOR TESTING ELECTRICAL CIRCUIT BREAKERS
Howard H. Aiken, Fort Lauderdale, Fla., James T. Marsh, Leonardtown, Md., and Allan I. Parvin, Clifton, N.J., assignors to Aiken Industries, Inc., a corporation of Delaware
Filed Dec. 20, 1966, Ser. No. 603,209
16 Claims. (Cl. 209—74)

This invention relates to a method and apparatus for testing devices at a constant rate and sorting the tested devices automatically in accordance with the elapsed time of response of the device to the test. The invention is especially applicable to testing and sorting electrical circuit breakers and will be described in connection therewith.

Electrical circuit breakers of one well known type trip or open when overloaded by electrical current. Such circuit breakers are commonly tested after their manufacture to determine their response characteristics to certain current loads, and then these tested circuit breakers are manually sorted in accordance with their response to the test. One type of test includes the application of a known test current to a number of circuit breakers while noting the elapsed time between the start of the test and the opening of the circuit breaker under the test current. The tested circuit breaker is then placed in a category directly related to the elapsed time of response from the start of application of the test current until the time the circuit breaker opens. Previously this operation of testing and sorting electrical circuit breakers was entirely manual.

This invention not only automates the previously manual operation of testing and sorting circuit breakers, but accomplishes the results in a simple but unique manner.

In general, a plurality of circuit breakers to be tested are placed into the test apparatus in removable magazines, then the circuit breakers are fed by a feed carriage to a test station where a plurality of circuit breakers are simultaneously clamped. A test current is fed to the clamped circuit breakers in test position and when the contacts of any one breaker open, the clamp on that breaker is released allowing the circuit breaker to fall by gravity into the inlet end of a rotating chute. The chute is rotated at a constant speed and the application of the test current is synchronized with the chute rotation, so that the position of the chute is directly related to the elapsed time of the test. The chute is inclined so that its outer end passes over a plurality of sorting areas. When a circuit breaker drops from test position into the chute due to its contacts opening under the test current, it is passed from the chute into a sorting bin directly related to the elapsed time of the test.

Other features of the invention will be pointed out in the following description and claims and illustrated in the accompanying drawings, which disclose by way of example, the principle of the invention and the best mode which has been contemplated of applying that principle.

Figure 6:
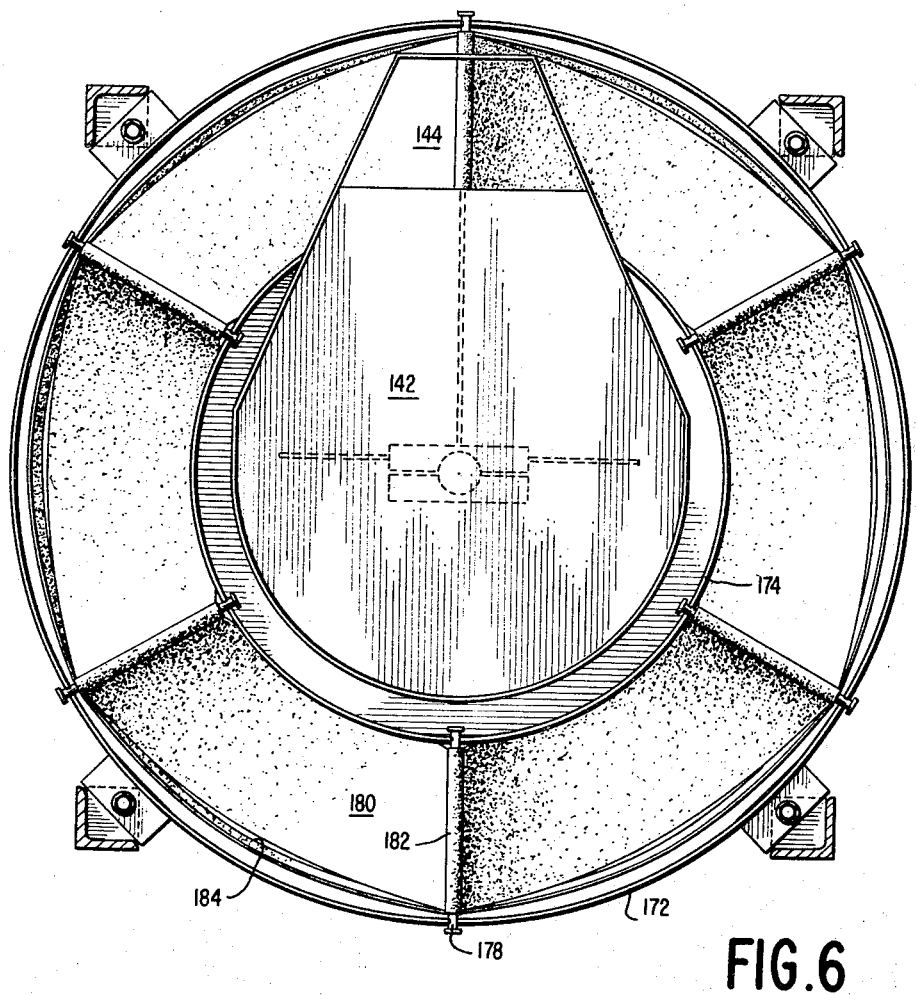
Figure 7:
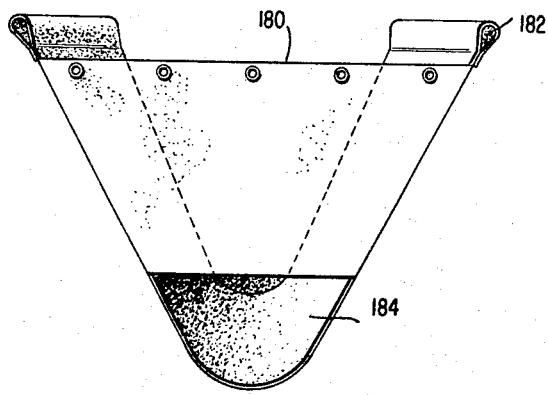
Figure 8:
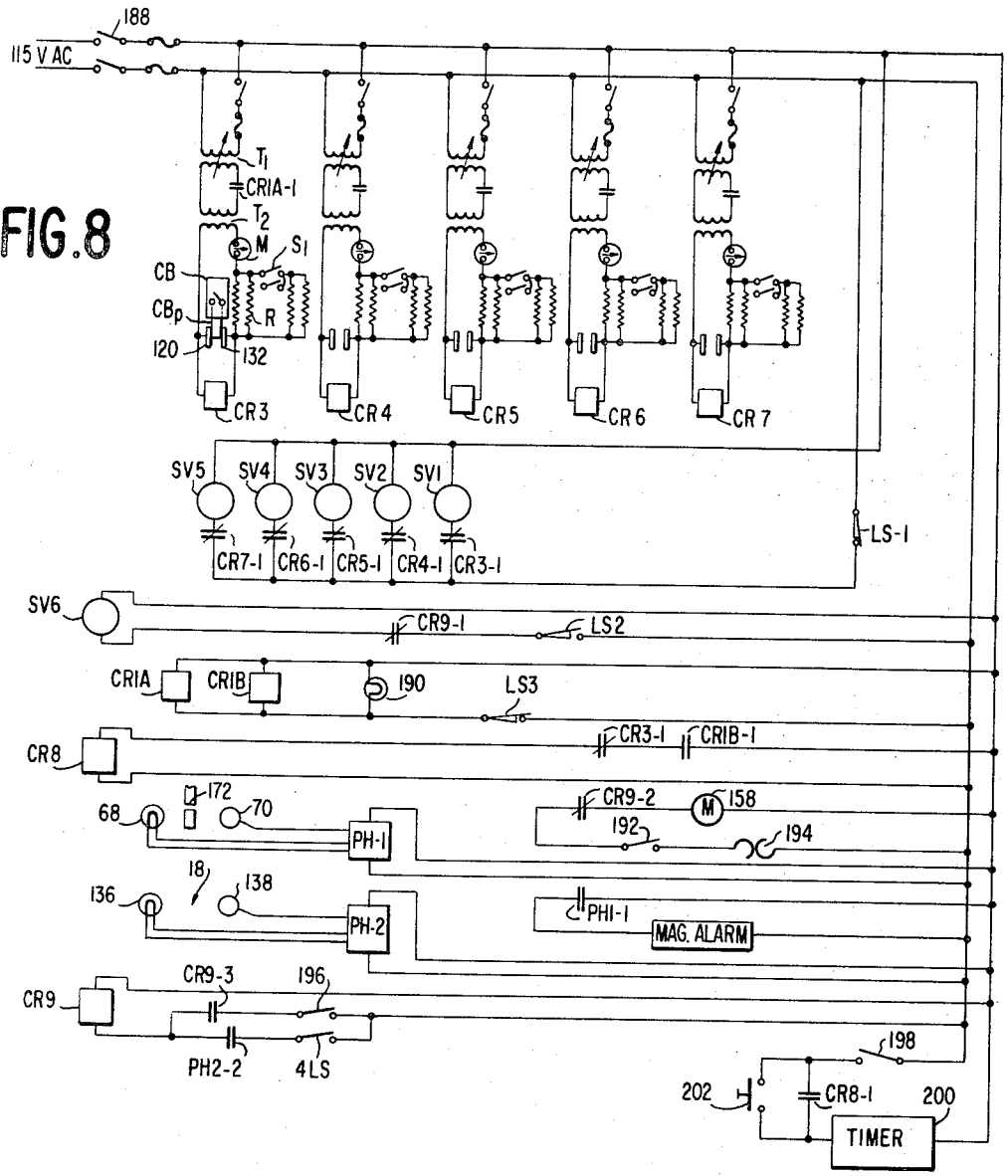
Figure 9:
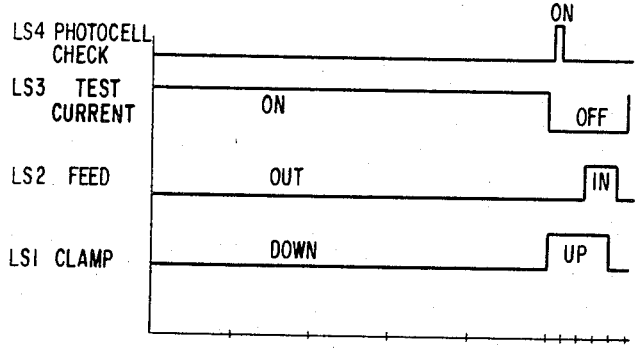

In the drawings:
FIG. 1 is a side elevation view of the circuit breaker testing and sorting apparatus of this invention;
FIG. 2 is a top plan view of the apparatus shown in FIG. 1;
FIG. 3 is a sectional view taken along line 3—3 of FIG. 2;
FIG. 4 is a sectional view similar to FIG. 3 but showing the feed carriage in extended position;
FIG. 5 is a sectional view similar to FIG. 3 showing the feed carriage in retracted position and a circuit breaker clamped in test position;

FIG. 6 is a top plan view of the sorting distributor and sorting areas;
FIG. 7 is an elevation view of a sorting cradle sack;
FIG. 8 is an electrical circuit diagram of the controls for the machine of this invention;
FIG. 9 is a timing diagram for the timing of the machine of this invention; and
FIG. 10 is a detail sectional elevation showing the portable magazine assembly fitting on the stationary magazine rack.

General assembly

In general the apparatus of this invention includes a support stand assembly 12, see FIGS. 1 and 2, which carries on its top a feed magazine assembly 14. Electrical circuit breakers CB to be tested to determine their response characteristics are carried in these feed magazines and are fed by a carriage feed assembly 16 to a test station 18, see FIGS. 2 and 4. At test station 18 the circuit breakers to be tested are clamped by a clamp assembly 20 which holds the prongs of the circuit breakers $CB_p$ while test current is supplied through the clamps and prongs to the circuit breaker.

At the time the circuit breaker opens or trips, an electrical circuit, FIG. 8, releases the clamp on the circuit breaker and the circuit breaker falls at that particular period of time into a sorting distributor assembly 24, FIGS. 1 and 6. This sorting distributor is synchronized with the application of the test current so that the outlet of the moving sorting distributor corresponds in position with the time of the test. Thus when the circuit breaker is released by the clamping assembly 20 when it trips, it will fall into the sorting distributor assembly and be distributed into one of a plurality of sorting zones 26 so that the sorting zone into which it falls corresponds with the time it took for the circuit breaker to respond to the test current.

Support stand assembly

The support stand assembly 12 includes four upright legs 28 which carry a table top 30 an appropriate distance above the level of the floor for the convenience of the operator and to hold the components of the apparatus. The table top 30 has an opening 32, FIGS. 2–5, at least in the center portion thereof so that the tested circuit breakers may drop through the table top into the sorting distributor assembly 24. The support stand also includes a lower support shelf 34 for carrying the drive aggregate and a switch support bracket 36 is carried by shelf 34. An intermediate support shelf 38 also carries support bracket 40 for sorting timing rings and supports a bearing 42.

Feed magazine assembly

The feed magazine assembly 14 is shown best in FIGS. 1, 2 and 10 and includes a plurality of movable magazines 44. Each of these magazines has an internal channel 46 with a guide tongue 48 secured to one face of the channel for guiding the circuit breaker prongs $CB_p$ on each side of the tongue as shown in FIG. 2. As can be seen in FIG. 10, the guide tongue 48 has a blind hole 50 in the bottom surface thereof and each magazine includes a hook 52 on the outside edge.

The movable magazines 44 fit on a stationary magazine rack 54. The stationary magazine rack includes a plurality of channels 56 aligned with the channels 46 of the movable magazines and these channels include bent front edges 58, FIG. 2. The stationary magazine rack also includes guide tongues 60 and these guide tongues have guide pins 62 extending into hole 50 for aligning the portable magazines 44 with the stationary magazine rack 54. A rod 64 extending horizontally and carried by upright supports 66 is positioned to be hooked over by hook 52 of the portable magazine 44.

A photocell 68 and light unit 70 are positioned on opposite sides of the stationary magazine and the light passes through hole 72 in the stationary magazine to determine the time when the level of all circuit breakers has passed below the level of hole 72, at which time the photocell gives a signal which indicates time to reload the portable magazines 44.

*Feed carriage assembly*

The feed carriage assembly 16 includes a reciprocable carriage 76 movable in response to actuation by an air cylinder 78 which has its piston rod connected to the carriage. The air cylinder 78 including its end block 80 is carried by shelf 82. The movable carriage 76 slides in slide bearings 84 and is actuated under the control of solenoid air valve SV6, FIG. 2.

The movable carriage 76 includes a carrying shelf 86 and a higher level cut-off and support shelf 88. The five circuit breakers CB being fed for testing simultaneously are separated on the carry shelf 86 by separators 90.

If desired, an additional mechanism, not shown, may be utilized to gently lower the lowest circuit breaker CB from the stationary magazine onto the support shelf 86 rather than have the circuit breaker drop on the support shelf at the time the cut-off shelf 88 is removed from the stack of circuit breakers.

FIGS. 3, 4 and 5 show the operation of the movable feed carriage 76 from the retracted position in FIG. 3, forward to feed a circuit breaker into position to be clamped in FIG. 4 and then back to retracted position in FIG. 5, at which time another circuit breaker has been positioned on carry shelf 86.

*Clamp assembly*

The five circuit breakers CB to be tested in test position 18 are held by clamp assembly 20. This clamp assembly includes a carrying bracket 108 secured by cap screws 110 to table top 30. The bracket 108 has a lower clamp angle 112 secured to it by screws 114 and this angle carries an insulator 116 supporting lead in conductors 118 and a removable copper clamp surface 120. As can be seen in FIG. 2, there are two such clamp surfaces 120, one for each prong $CB_p$ of a circuit breaker being tested. Flexible lead wires, not shown, are connected from a source of test current to lead in conductor 118, and of course insulated from the machine by insulator block 116.

The upper clamp is movable but is otherwise of somewhat similar construction and is carried by a support angle 122 secured to bracket 108 by screws 124 with the other arm of the angle secured to a clamp cylinder 126. The clamp cylinder is an air cylinder which is activated under control of an air solenoid. There are five circuit breakers tested with a separate clamp cylinder for each circuit breaker and hence a separate control solenoid for each circuit breaker. These are designated SV1 in FIG. 3 and SV2, SV3, SV4 and SV5 in FIG. 2. A piston rod 127 of air cylinder 126 is connected to insulator block 128 and this insulator block also carries lead in conductor 130 mounting a removable copper clamp surface 132. In a similar manner, electrical conductors are connected to the lead in conductor 130 to apply the test current and the clamp surface 132 mates with the surface 120, there being two for each air cylinder actuated clamp. The solenoid actuated valevs SV1–5 control the application of air to activate the air cylinder 126 and at the time the movable carriage 76 has fed the circuit breakers into test position 18. The clamping pressure is continued untii the time the circuit breaker opens at which time solenoid valves SV1–5 are selectively actiated to release the clamp and allow the circuit breaker to drop through opening 32 in the table top. A plurality of leaf springs 134 are secured to the stationary magazine above each breaker in test position to serve the purpose of holding the breaker on feed shelf 86 as it is fed into test position and to assist gravity in removing the circuit breaker when the clamp is released upon tripping of the breaker.

In addition, a system to determine if circuit breakers are in test position includes a photocell 136 and photocell activating light 138 on opposite sides of the test position 18 and is shown in FIG. 2. This photocell and lamp are utilized to interlock the system in case circuit breakers are in test position after the test has been completed.

*Sorting distributor assembly*

The sorting distributor assembly 24 includes a movable timing chute 140 shown in FIGS. 1 and 6. This chute has an open inlet end 142 which underlies the opening 32 in table 30 to catch all the circuit breakers CB after they are tested and fall from the test position. The timing chute 140 also includes an outlet end 144 which may be directed vertically downward as shown. If desired a rubber curtain, not shown, can be added to the chute outlet 144 to slow the velocity of the falling circuit breakers. The chute includes a mounting bracket 146 and a split hub mounting clamp 148 for mounting the chute for rotation about the axis of a vertical drive shaft 150. This drive shaft is supported in bearing 42 and bearing 152. Drive shaft 150 and hence timing chute 140 are driven at a constant speed, for example 2 r.p.m., through a transmission 154 connected to shaft 150 by chain drive 156 from an electric motor 158 connected by belt and pulley drive 160 to the transmission 154. Although the timing chute is continuously rotated in the described preferred embodiment, it could also move intermittently, so long as the chute rotation is synchronized with the start of the test.

Mounted on the lower end of shaft 150 are four cams 162, 164, 166 and 168, these cams are for purposes of timing and they actuate limit switches LS1, LS2, LS3 and LS4, positioned on top of support 36. FIG. 9 shows the timing diagram accomplished by the cams for timing the opening and closing of the limit switches.

*Sorted circuit breaker zones*

The sorting distributor assembly carries the circuit breaker to a position related to the time of response of the breaker to the test current and since the outlet end 144 of the timing chute 140 is moving in a circle, the sorted breaker zones are also circularly arrayed. One convenient means of providing such zones is with outer and inner timing rings 172 and 174 respectively, which rings have slots 176 positioned therein a predetermined distance apart, in the illustrated embodiment the slots 176 are 6° apart. A plurality of sorting sacks 180 are variably supported from the timing rings by loops 182 in the sacks extending over pins 178, which pins are positioned in the slots 176 in the outer and inner timing rings 172 and 174. In this manner the position of the pins 178 determines the degree of arc and hence the time span for accepting a certain category of tested circuit breakers. The sorting sacks may conveniently have an inclined bottom with an opening 184 therein leading into a receptacle or other suitable portable box 186 for receiving any desired category of tested and sorted circuit breakers. Obviously, the sorting zones can be defined by devices other than cloth sacks.

*Operation*

It is believed that the general operation is apparent from above, but a further detailed description of the operation will now be described in connection with the electrical circuit diagram of FIG. 8 and timing diagram of FIG. 9.

The start of the timing cycle illustrated in FIG. 9 is with the circuit breaker CB in test position 18 as illustrated in FIG. 5 and the test current just turned on. This corresponds to a reference position of the timing chute 140, at which time can 164 has turned LS3 on. Naturally the clamping assembly 20 is down with the clamping cylinders 126 down as activated by SV1–5 under the control of LS1 and CR3-7. At that time also the feed carriage 76 is retracted or out under the control of SV6 which is in turn controlled by LS2. LS4 controls the interrogation of photocell 136. During most of the portion of the cycle up to about 300° of arc which would be 25 seconds at a rate of movement of shaft 150 at 2 r.p.m., the test current is continually applied and circuit breakers undergoing test individually open within this period of time. At the time any circuit breaker opens its corresponding clamp cylinder 126 retracts under control of corresponding solenoid valve SV1 allowing the circuit breaker to drop into the inlet 142 of the timing chute 140 and pass by gravity out the outlet 144 into a corresponding sorting sack 180. By 25 seconds all of the circuit breakers under test should have dropped out. At this time the limit switch LS1 controls the circuit so that the clamping cylinder 126 goes up and hence all untripped circuit breakers should drop into the timing chute. At the same time the test current is turned off. A slight period after this time, limit switch LS4 checks to see if the photocell 136 is receiving light from light 138 which is an indication of whether or not any circuit breakers are left in test positon after the test is completed. Obviously all circuit breakers must be removed from test position before a new group of untested circuit breakers are fed into test position. If the test position is clear, as is should be at that time, the feed cylinder is moved in under the control of LS2, about 26½ seconds or ½ second after the photocell control limit switch LS4 is closed. At the time the feed cylinder feeds the new set of circuit breakers into test position, the test current is, of course, off. Just prior to the feed cylinder retracting, the clamp cylinder 126 is actuated under the control of LS1 so that the breakers are clamped prior to the feed cylinder being retracted so that none of them drop inadvertenly. After the clamp is down the feed cylinder is then retracted a half a second later in the timing cycle and a further half a second later the test current is applied, at which time a new cycle is started.

FIG. 8 shows the circuit in more detail. There are five test stations and since all five are identical only one need be described in detail. The circuit schematically shows the clamping contacts 120 and 132 which clamp the circuit breaker between to pass current through the circuit breaker trip contacts. The 115 volt A.C. current is introduced through a manual control switch 188 and suitable fuses to a variable transformer T1 which adjusts the current level. The current then passes through the contacts of relay CR1A which contacts are normally open but are closed when test current is to be applied and through transformer T2 and meter M to apply test current which is regulated or kept constant by the amount of resistance R placed in the circuit with the circuit breaker. A switch S1 can be connected to apply more resistance in parallel to adjust the voltage to the operating level of relay CR3. The coil of relay CR3 is connected in parallel across the circuit breaker CB being tested. As long as the circuit breaker's contacts are closed coil CR3 will not be energized because the circuit is open across CR3 and no current is flowing. Upon opening of the circuit breaker's contacts voltage is then impressed across CR3 to energize CR3 opening normally closed contacts CR3-1 which are in circuit with SV1. Thus at the time the circuit breaker CB opens coil CR3 is energized switching control solenoid valve SV1 and allowing the corresponding clamp cylinder 126 of position one to move up releasing the clamp on circuit breaker position one so that it will fall by gravity and with the assistance of spring 134 into the inlet end 142 of the rotating timing chute 140. The other four test stations have similar relays CR4-7, which control similar relay points in series with solenoid valves SV2-5 as shown in FIG. 8. LS1 of course is closed by its corresponding cam during most of the cycle at which time the test current is applied. With this arrangement, any time an individual circuit breaker in any one of the five test positions opens or trips by virtue of the test current applied through it, the corresponding clamp on that particular circuit breaker releases, allowing the breaker to fall into the timing chute.

The feed solenoid valve SV6 controlling the operation of the feed carriage 76 is in series with the line current and normally closes contacts at relay CR9 as well as LS2. LS2 is closed at the time on the timing chart that the feed carriage should move in and opened at the time the feed carriage should retract. Normally closed contacts CR9-1 are for interlock safety purposes to prevent the feed carriage from moving if the test position is not clear of circuit breakers as determined by the photocell and light set 136, 138.

LS3 is closed to apply the test current which in effect energizes relays CR1A, CR1B and pilot light 190 as shown in FIG. 8. When CR1A is energized, its normally open contacts CR1A-1 are closed to then apply test current to a circuit breaker CB while in test position.

Application of the test current which energizes relay coil CR1B causes closing of normally open contact CR1B-1 which applies current through relay coil CR8 since contacts CR3-1 of test position one are normally closed until CR3 is energized at the time the circuit breaker CB in that test position has tripped or opened. Hence CR8 will be energized until the circuit breaker CB in the first test position opens or trips. CR8 is utilized only to control a timer 200.

The drive motor 158 for the vertical shaft 150 and the timing chute is under control of a motor switch 192 and the usual motor protector 194 and interlocked with the normally closed contacts CR9-2. When relay CR9 is energized, meaning that the breakers have not cleared the test position at the end of a test, then motor 158 is stopped.

Lamp 70 and photocell 68 are positioned on opposite sides of hole 72 through the stationary magazine or magazine rack. With circuit breakers in the magazine, response of cell 68 will be blocked. At the time, however, the magazine is empty, cell 68 will be energized, operating amplifier PH1 to close normally open contacts PH1-1 in series with the magazine alarm and cause the magazine alarm to operate. This magazine alarm may be a suitable buzzer to warn an operator that the magazines are low and need reloading. Lamp 138 and photocell 136 are on opposite sides of the test position 18 and when any circuit breaker is in test position at the end of a test, response of amplifier PH2 will change to close normally open contacts PH2-2. As can be seen from the circuit diagram, PH2-2 contacts are in series with 4LS. At the time in the timing cycle that the test current has been turned off and all clamp cylinders are up, 4LS closes to in effect inquire if the test position is clear. If the test position is clear, normally open contacts PH2-2 are open and relay CR9 is not energized. On the other hand, if the test position has circuit breakers still in it at the time 4LS closes, then PH2-2 contacts are closed, CR9 is energized opening normally closed relay contacts CR9-1 in series with the feed cylinder solenoid valve SV6 and CR9-2 in series with the drive motor 158, thus stopping the apparatus.

To take care of the rare case where the machine stops at the time in the timing cycle that 4LS is closed and in order to start the machine again, an alternate path is provided by normally closed switch 196 in series with contacts CR9-3 which are normally open.

A timer 200 is utilized to determine the lapsed time of the application of the test current to the circuit breaker CB in the first test position. To actuate the timer, switch 198 is closed, and with the circuit breaker undergoing test in the test position, relay CR8 is energized closing normally open contact CR8-1 and starting the timer. At the time the circuit breaker in test position one trips and is dropped from the test position, CR8 is dropped out under the control of contact CR3-1, thus stopping the timer by opening normally open contact CR8–1. A reset switch 202 is utilized to reset the timer.

As can be seen, applicant has provided a simple apparatus for testing and sorting devices in accordance with the time of response to a standard test. In the case of circuit breakers, the time of response is to a test current and the sorting is accomplished by moving a sorting distributor which is synchronized in its movement with the application of the test current.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for testing the opening characteristics of electrical circuit breakers and sorting the breakers into separate groups corresponding to their opening characteristics under test current, the apparatus comprising;
   (a) a support stand,
   (b) means to hold a circuit breaker in a test position on the support stand,
   (c) means to supply a test current to the circuit breaker in the test position,
   (d) a movable sorting distributor having an inlet end below the test position and an outlet end movable over a plurality of separate sorted breaker bins,
   (e) drive means connected to the sorting distributor to drive the sorting distributor at a constant rate,
   (f) test current control means actuatable by the drive means to apply the test current to a circuit breaker in test position at a predetermined time related to a reference position of the movable sorting distributor, and
   (g) means responsive to opening of contacts of the circuit breaker in test position to release the hold on such breaker and allow it to fall into the inlet end of the sorting distributor and move out the outlet end of the sorting distributor into one of the bins according to the elapsed time since the application of the test current.

2. Apparatus as in claim 1 further comprising means carried by the support stand for feeding a plurality of circuit breakers simultaneously to the holding means in test position.

3. Apparatus as in claim 2 wherein the means carried by the support stand for feeding a plurality of circuit breakers simultaneously is a reciprocable feed plate movable in a horizontal plane and further comprising a plurality of circuit breaker magazines positioned above the feed plate.

4. Apparatus as in claim 3 wherein the magazines are removable from a stationary magazine rack carried by the support stand.

5. Apparatus as in claim 4 further comprising photocell means adjacent the magazine and magazine rack for sensing an empty magazine condition.

6. Apparatus as in claim 1 wherein a plurality of circuit breakers are subjected to test current simultaneously and the means for holding a circuit breaker in test position includes a clamping cylinder operative to actuate conductive clamps for clamping conductive prong plugs of the circuit breaker.

7. Apparatus as in claim 6 wherein test current is applied through conductive clamps and the circuit breaker prongs.

8. Apparatus as in claim 7 wherein the means for releasing the hold on the breakers in test position is a control circuit with relays for actuating solenoid controls for clamp cylinders.

9. Apparatus as in claim 1 wherein the movable sorting distributor is a rotatable chute having an inlet end thereof rotatable below the test position on the stand and an outlet end thereof rotatable over the sorting bins which are arranged in a circular array.

10. Apparatus as in claim 9 wherein drive means connected to the rotary chute sorting distributor is an electric motor, transmission and vertical shaft connected to the rotatable chute.

11. Apparatus as in claim 10 wherein test current control means is a switch operated by a cam on vertical shaft.

12. A method of testing and sorting circuit breakers comprising;
   (a) applying a test current to a circuit breaker held in a test position so that contacts of the breaker will open a certain time after application of the test current,
   (b) moving a sorting distributor at a constant rate relative to a plurality of sorting zones,
   (c) synchronizing the application of test current with the movement of the sorting distributor, and
   (d) removing the circuit breaker from the test position into the sorting distributor at the moment the circuit breaker opens under application of the test current.

13. A method of testing and sorting circuit breakers as defined in claim 12 wherein moving the sorting distributor at a constant rate is accomplished by rotating the sorting distributor and the sorting zones are circularly arranged.

14. A method of testing and sorting circuit breakers as defined in claim 13 wherein the circuit breaker is held in test position by clamping and removing the circuit breaker from test position into the sorting zones is accomplished by releasing the clamping hold and allowing the test breaker to drop by gravity into the sorting distributor.

15. A method of testing and sorting circuit breakers as defined in claim 14 wherein synchronizing the application of the test current with movement of the sorting distributor is accomplished by starting the application of test current and at the same time starting the rotation of the sorting distributor from a zero reference position.

16. A method of testing devices and sorting the tested devices in accordance to the elapsed time the devices take to respond to the test, the method comprising;
   (a) positioning a device in a test position,
   (b) testing the device at a constant rate so that the time of response to the test by the device is indicative of a tested characteristic of the device,
   (c) distributing the tested devices into separated sorted groups in accordance with the tested characteristic,
   (d) accomplishing the distributing by moving a distributor at a constant rate over a group of separate sorted device areas,
   (e) synchronizing the start of the testing with movement of the distributor from a reference position, and
   (f) moving the tested device from the test position into the distributor at the moment the device responds to the test so that the sorted device area into which the tested device is distributed has a direct relation to the elapsed time of the test.

References Cited

UNITED STATES PATENTS 3,059,215 10/1962 Proskauer _____ 209—81 X
3,176,840 4/1965 Bickel _____ 209—74

M. HENSON WOOD, Jr., *Primary Examiner.*

R. A. SCHACHER, *Assistant Examiner.*